Patented May 16, 1939

2,158,051

UNITED STATES PATENT OFFICE 2,158,051

PROCESS FOR PRODUCING MONOVINYL ACETYLENE

Herbert Berg and Hans Heim, Burghausen, and Franz Leiss, Munich, Germany, assignors to Dr. Alexander Wacker Gesellschaft für Elektrochemische Industrie, G. m. b. H., Munich, Bavaria, Germany, a corporation No Drawing. Original application July 7, 1937, Serial No. 152,374. Divided and this application April 23, 1938, Serial No. 203,816. In Germany July 17, 1936

12 Claims. (Cl. 260—678)

This invention relates to the production of monovinyl acetylene and is a division of our application Serial No. 152,374, filed July 7, 1937.

The principal object of the invention is to provide a new and improved process for producing monovinyl acetylene.

Another object of the invention is to provide an improved process for producing monovinyl acetylene in the vapor phase by passing acetylene at elevated temperatures over solid copper-containing ternary catalysts.

We have made the surprising discovery that when using non-acid catalysts according to our process the expected explosive copper-acetylene composition is not produced, but that a practically complete transformation of the acetylene into monovinyl acetylene is effected without appreciable by-products, when the catalyst is composed of three definite components of the type hereinafter described.

The catalyst, according to our invention, comprises a cuprous salt which is in itself useless, and which must be activated by suitable additions. Such activators, the effect of which apparently rests on their complex formation with the cuprous salts, comprise organic compounds containing a plurality of hydroxyl groups, specifically aliphatic polyhydric alcohols and sugar, including such aliphatic polyhydric compounds as glycols, e. g., butylene glycol, glycerine, mannitol, sorbitol, dulcite, and the like; and, with these substances, salts of metals of the first, second and third groups of the periodic system are present with inclusion of rare earths, predominantly the water soluble ones, particularly the halogenides, e. g., chlorides.

The production of the catalyst is appropriately effected in such a way that the initial products in dissolved or suspended condition are placed upon a suitable carrier and the latter is then dried. For instance, cuprous chloride, magnesium chloride and glycerine are heated with some water and the suspension is placed upon appropriate carriers, e. g., potsherds, pumice stone and the like, upon which it is dried. After drying in an inert gas or in vacuum, the catalyst is ready for use. Of course it is also possible to produce the catalyst in such a manner that the desired compounds are formed on the carrier by chemical combination.

The acetylene reaction is preferably effected at temperatures over 100° C. The temperature range, in which the catalyst is active, changes according to the nature of the catalyst employed; in most cases a range of 100–180° C. has been found suitable. The process is not limited to any definite pressure, but the course of the reaction may be influenced by changing the pressure. For example, by increasing the pressure the conversion is improved and the monovinyl acetylene may be condensed and/or separated off from the waste gases by cooling with tap or main water.

It is advantageous to mix with the acetylene which enters the reaction chamber small quantities of a volatile acid, such as acetic acid, propionic acid or butyric acid, or it may be thinned or diluted with inert gases such as nitrogen. Since the catalyst becomes very strongly heated during the reaction, it is generally advantageous to cool it, for example by external cooling of the reaction chamber, or by an excess of acetylene or by addition of an inert gas. Furthermore, through an excess of acetylene or admixture of an inert gas, the monovinyl acetylene which is generated is very quickly removed from the reaction chamber and thus the formation of by-products is still further retarded. The gas which leaves the reaction chamber may be used again in carrying out the reaction. Before being returned to the reaction chamber, the reaction products are appropriately removed, wholly or in part, as by cooling, absorption, adsorption, or dissolution, and fresh acetylene is advantageously added in accordance with the quantity used up.

The monovinyl acetylene obtained according to the process herein described is suitably used for chemical conversions, as in the production of artificial masses and the like.

Example 1

For the production of the catalyst, a mixture of 300 g. of cuprous chloride, 50 g. of magnesium chloride and 100 g. of glycerine are heated with 150 cc. of water on a boiling water bath, and after addition of pumice stone while being stirred it deposits on the same. After drying in a nitrogen current, the catalyst is placed in a catalyst chamber which is adapted to be heated and, if necessary, capable of being cooled. Thereupon, pre-purified acetylene, as required by standard practice in a quantity of 30 to 40 liters per hour is passed through the chamber at a temperature of 155–165° C. The temperature is advantageously held as constant as possible, which may be attained by artificial cooling or corresponding regulation of the acetylene supply. The reaction products which are formed in a practically quantitative yield from the converted acetylene are removed from the waste gas by cooling, compression or dissolution, said reaction products containing about 93-98% monovinyl acetylene. The acetylene which has not been converted may be again introduced into the reaction chamber after addition of fresh acetylene.

Example 2

A mixture of 300 g. of cuprous chloride, 100 g. of mannite and 50 g. of magnesium chloride is formed into a dough with water and deposited upon pumice stone after which it is dried in a nitrogen current. Acetylene which contains small quantities of acetic acid is conducted over the catalyst thus obtained at a reaction temperature of 179-180° C. The output is just as favorable as in the example cited above.

The invention claimed is:

1. Process for producing monovinyl acetylene which comprises passing acetylene through a solid catalyst containing a cuprous salt, magnesium chloride and an aliphatic polyhydric alcohol.

2. Process for producing monovinyl acetylene which comprises passing acetylene at a temperature of 100-180° C. through a solid catalyst containing a cuprous salt, magnesium chloride and an aliphatic polyhydric alcohol.

3. Process for producing monovinyl acetylene which comprises passing acetylene at a temperature of 100-180° C. through a solid catalyst containing a cuprous chloride, magnesium chloride and an aliphatic polyhydric alcohol.

4. Process for producing monovinyl acetylene which comprises passing acetylene at a temperature of 100-180° C. through a solid catalyst containing a cuprous salt, magnesium chloride and an aliphatic polyhydric alcohol, said catalyst being applied on a carrier.

5. Process for producing monovinyl acetylene which comprises passing acetylene at a temperature of 100-180° C. through a solid catalyst containing a cuprous chloride, magnesium chloride and glycerin, said catalyst being applied on a carrier.

6. Process for producing monovinyl acetylene which comprises passing acetylene at a temperature of 100-180° C. through a solid catalyst containing a cuprous salt, magnesium chloride and an aliphatic polyhydric alcohol, the efficiency of said catalyst being increased by admixing with the acetylene vapors a volatile carboxylic acid.

7. Process for producing monovinyl acetylene which comprises passing acetylene at a temperature of 100-180° C. through a solid catalyst containing a cuprous chloride, magnesium chloride and glycerin, said catalyst being applied on a carrier and having its efficiency increased by admixing with the acetylene vapors a volatile carboxylic acid.

8. Process for producing monovinyl acetylene which comprises passing acetylene at a temperature of 100-180° C., and in a quantity greater than is to be converted in the reaction, through a solid catalyst containing a cuprous salt, magnesium chloride and an aliphatic polyhydric alcohol.

9. Process for producing monovinyl acetylene which comprises passing acetylene at a temperature of 100-180° C., and in a quantity greater than is to be converted in the reaction, through a solid catalyst containing a cuprous salt, magnesium chloride and an aliphatic polyhydric alcohol, the efficiency of said catalyst being increased by admixing with the acetylene vapors a volatile carboxylic acid.

10. Process for producing monovinyl acetylene which comprises passing acetylene at a temperature of 100-180° C., and in a quantity greater than is to be converted in the reaction, through a solid catalyst containing a cuprous salt, magnesium chloride and an aliphatic polyhydric alcohol, removing the reaction product from the acetylene and returning the latter to the reaction zone while replenishing the converted acetylene with fresh gas.

11. Process for producing monovinyl acetylene which comprises passing acetylene at a temperature of 100-180° C., and in a quantity greater than is to be converted in the reaction, through a solid catalyst containing a cuprous salt, magnesium chloride and an aliphatic polyhydric alcohol, said catalyst being applied on a carrier and having its efficiency increased by admixing with the acetylene vapors a volatile carboxylic acid, removing the reaction product from the acetylene and returning the latter to the reaction zone while replacing the converted acetylene with fresh gas.

12. Process for producing monovinyl acetylene which comprises passing acetylene at a temperature of 100-180° C., and in a quantity greater than is to be converted in the reaction, through a solid catalyst containing a cuprous chloride, magnesium chloride and glycerin, said catalyst being applied on a carrier and having its efficiency increased by admixing with the acetylene vapors a volatile carboxylic acid, removing the reaction product from the acetylene and returning the latter to the reaction zone while replacing the converted acetylene with fresh gas.

HERBERT BERG.
HANS HEIM.
FRANZ LEISS.

CERTIFICATE OF CORRECTION.

Patent No. 2,158,051.                                May 16, 1939.

HERBERT BERG, ET AL.

It is hereby certified that error appears in the printed specification of the above numbered patent requiring correction as follows: Page 2, first column, line 16, for "179-180° C." read 170-180° C.; and that the said Letters Patent should be read with this correction therein that the same may conform to the record of the case in the Patent Office.

Signed and sealed this 13th day of June, A. D. 1939.

Henry Van Arsdale (Seal)                          Acting Commissioner of Patents.